Patented June 4, 1929.

1,716,063

UNITED STATES PATENT OFFICE.

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE.

PREPARATION OF TRISAZO DYES.

No Drawing.   Application filed October 22, 1925.   Serial No. 64,254.

This invention relates to the preparation of trisazo dyes for direct application to cotton. More particularly it is concerned with gray to blue-green and green trisazo dyes made from a derivative of an amino-azo-compound and a 1:8-aminonaphthol derivative.

In brief the process consists in coupling a diazo compound to an amine or an amino-sulphonic acid, diazotizing the obtained monoazo dye, coupling it to a 1:8-amino-naphthol derivative, diazotizing the disazo dye again and finally coupling the resulting intermediate to a compound having either the grouping —CH—CO— as, for example, aceto-acetanilide or other aceto-acetarylids or their homologues and derivatives and derivatives of pyrazolone or having the grouping —C=CH, as for example in methyl-ketole.

The process can best be disclosed by the presentation of a number of examples of actual embodiments thereof. It is to be understood, however, that such examples are furnished by way of illustration only, and that the details of procedure followed therein as well as the proportions, reagents, temperatures, etc., therein disclosed are susceptible to variation and substitution.

Example 1.

107 parts of ortho-toluidine are diazotized in the usual way with 69 parts of sodium nitrite. The diazo solution is added to a solution of 223 parts of 1:6-Cleve's acid in 4000 parts of water and 53 parts of sodium carbonate, containing 170 parts of sodium acetate. The coupling is made at 10–15° C. After one hour's stirring it will be complete. It is made slightly alkaline with sodium hydroxide, then acidified again with 450 parts of a 31% hydrochloric acid solution. 69 parts of sodium nitrite are added at 10–15° C., leaving the diazotization stir for one hour. The diazo compound thus obtained is added to a solution of 341 parts of 1:8-amino-naphthol-3:6-disulphonic acid containing 700 parts of sodium carbonate. The temperature of the coupling should be 5–10° C. The color of this intermediate dye is bright greenish-blue. The dye is precipitated with salt and filtered. The paste is stirred up with 5000 parts of water, acidified with 400 parts of a 31% hydrochloric acid, and 69 parts of sodium nitrite are added. Meanwhile the temperature of the mixture is kept at about 25° C. The blue color of the dye changes to the dark green of diazo compound. After ½ hour's stirring the diazo compound is added to a solution of 177 parts of aceto-acetanilide in 4000 parts of water and 40 parts of sodium hydroxide, which contains 550 parts of sodium carbonate. The temperature during the coupling is 5–10° C. The dye is salted out at about 70° C. In its dry form it is a dark bronzy looking powder, which dissolves in water with a bright green color, dyeing cotton in green shades of a remarkable fastness to light. It has probably the following structural formula:

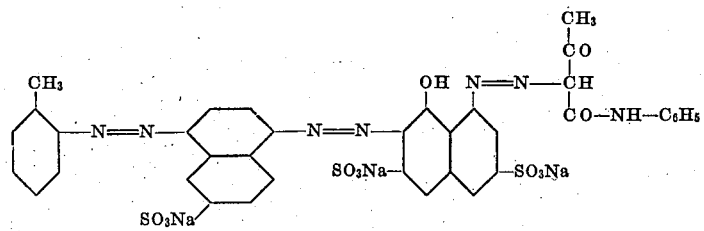

On reducing this dye with stannous chloride the following compounds are obtained: o-toluidine, 1:4-naphthylene-diamine-6-sulphonic acid, 1:7-diamino-8-hydroxy-naphthalene-3:6-disulphonic acid, alpha-amino-aceto-acetanilide.

Using an equivalent amount of phenylmethyl-pyrazolone instead of aceto-acetanilide, a yellower, duller green is obtained of similar properties as the aceto-acetanilide dye. It has probably the following structural formula:

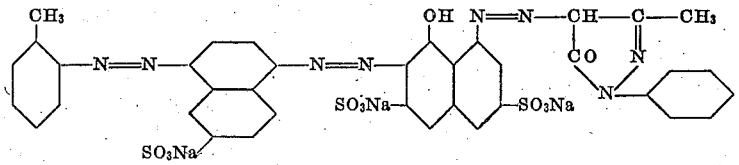

Example 2.

Substituting, for the 107 parts of o-toluidine employed in Example 1, 173 parts of para-sulphanilic acid, a somewhat bluer, but much brighter green is obtained, the fastness to light being the same as that from Example 1.

The pyrazolone dye again shows a yellower, duller shade than the aceto-acetanilide dye.

The reduction products resulting from reducing with stannous chloride are the same as in Example 1, except sulphanilic acid is obtained instead of o-toluidine.

Example 3.

Using instead of 107 parts of o-toluidine, as in Example 1, 223 parts of 1:4-naphthionic acid, leaving the other intermediates and conditions the same, a little yellower and even brighter green than that one of Example 2 is obtained. It has probably the following structural formula:

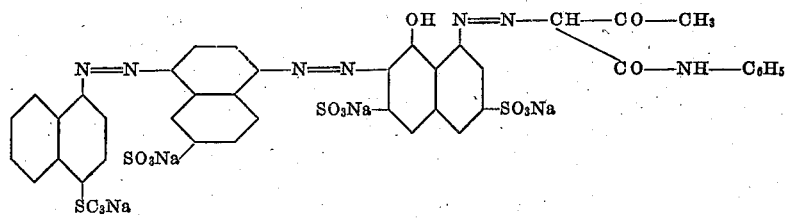

The reduction products resulting from reduction with stannous chloride are the same as in Example 1, except 1:4-naphthionic acid is obtained instead of o-toluidine.

Example 4.

Using 127.5 parts of orthochloroaniline, instead of 107 parts of o-toluidine, as in Example 1, and 223 parts of 1:7-Cleve's acid instead of 1:6-Cleve's acid, a dye is obtained which dissolves in water with a dark bluish-green color and dyes cotton in greenish-gray shades.

On reducing with stannous chloride this dye will give the same compounds as that of Example 1, except orthochloroaniline is obtained instead of o-toluidine.

Example 5.

Using 143 parts of alpha-naphthylamine instead of 107 parts of o-toluidine as in Example 1, leaving the other intermediates and conditions the same, an olive dye is obtained, soluble in water with a yellowish-green color, dyeing cotton in deep olive shades. It has probably the following structural formula:

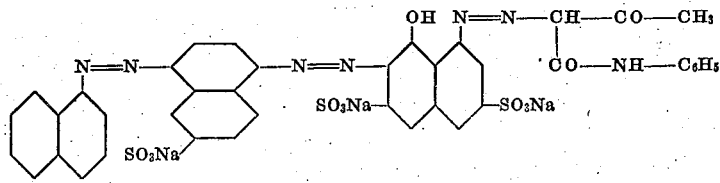

The reduction products are the same as in Example 1, except alpha-naphthylamine is obtained instead of o-toluidine.

Example 6.

303 parts of 2-naphthylamine-4:8-disulphonic acid are diazotized in the usual way with 69 parts of sodium nitrite. 143 parts of alpha-naphthylamine, dissolved at 80° C. in 2000 parts of water and 140 parts of a 31% hydrochloric acid, are added to the diazo compound, keeping the coupling temperature at 10–15° C. The mineral acid reaction is neutralized by sodium acetate. The coupling will be complete after about one hour's stirring. It is brought back to acid reaction by hydrochloric acid and filtered. The acid paste is stirred up with 3000 parts of water, made alkaline with 60 parts of sodium hydroxide, then 400 parts of salt are added and 450 parts of hydrochloric acid (31%), after which it is diazotized at 15–20° C. with 69 parts of sodium nitrite. The diazo compound is stirred three hours and is then added to a solution of 341 parts of 1:8-amino-naphthol-3:6-disulphonic acid containing 700 parts of sodium carbonate, keeping the coupling temperature at 5–10° C. The dye is precipitated with salt and filtered. The last diazotization and coupling to aceto-acetanilide is carried out as described in Example 1. The dye dissolves in water with a bright green color, dyeing cotton in green shades, which are a trace duller than those of Example 3.

On reducing with stannous chloride the following compounds will be obtained:
2-naphthylamine-4:8-disulphonic acid,
1:4-naphthylene-diamine,
1:7-diamino-8-hydroxy-naphthalene-3:6-disulphonic acid, alpha-amino-aceto-acetanilide.

*Example 7.*

223 parts of 1:5-naphthylamine-sulphonic acid are diazotized in the usual way and coupled to 1:6-Cleve's acid as described in Example 1. The diazotization of the monoazo dye is carried out in the same way as in Example 1. The diazo compound is then combined with 239 parts of 1:8-amino-naphthol-4-sulphonic acid, dissolved in 3000 parts of water and 700 parts of sodium carbonate. The disazo dye is precipitated with salt and filtered. It is rediazotized in the same way as shown in Example 1. The diazo compound is coupled at 5–10° C. to a solution of 174 parts of phenyl-methyl-pyrazolone in 4000 parts of water and 550 parts of sodium carbonate. The dye is precipitated with salt and filtered. It dissolves in water with a yellowish-olive color, dyeing cotton in yellowish-olive shades. It has probably the following structural formula:

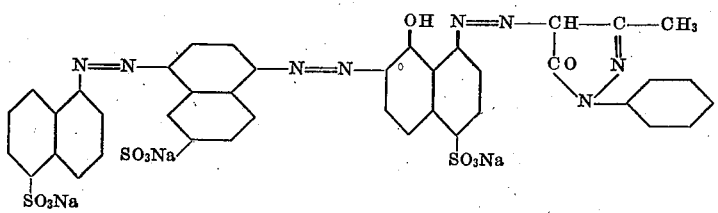

On reducing with stannous chloride the following compounds will be obtained:
1:5-naphthylamine-sulphonic acid,
1:4-naphthylenediamine-6-sulphonic acid,
1:7-diamino-8-hydroxynaphthalene-4-sulphonic acid, and
1-phenyl-3-methyl-4-amino-pyrazolone

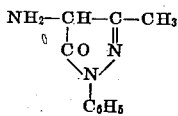

*Example 8.*

341 parts of 1:8-amino-naphthol-3:6-disulphonic acid are diazotized in the usual way. To the diazo compound there is added a solution of 143 parts of alpha-naphthylamine in 2000 parts of water and 140 parts of hydrochloric acid (31%), keeping the temperature of the coupling at about 10° C. The acidity is neutralized with sodium acetate. The coupling will be complete after one-half hour's stirring. The coupling is made slightly alkaline with sodium hydroxide, cooled to 0°, acidified again with 450 parts of hydrochloric acid and diazotized with 69 parts of sodium nitrite. The diazo compound is stirred one-half hour and is then coupled to 341 parts of 1:8-amino-naphthol-3:6-disulphonic acid dissolved in 3000 parts of water and 700 parts of sodium carbonate. The dye is precipitated with salt and filtered. The last diazotization and coupling to aceto-acetanilide is carried out in the same way as shown in Example 1. This dye is soluble in water with a bright greenish-blue color, dyeing cottom in bright greenish-blue shades.

On reducing with stannous chloride, the following compounds will be obtained:
1:8-amino-naphthol-3:6-disulphonic acid,
1:7-diamino-8-hydroxy-naphthalene-3:6-disulphonic acid,
1:4-naphthylenediamine, and alpha-amino-aceto-acetanilide.

*Example 9.*

Using instead of 177 parts of aceto-acetanilid as in Example 3, 131 parts of methylketole,

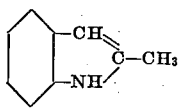

which is dissolved in 350 parts of 31% hydrochloric acid, then added to the last intermediate diazo solution, making the coupling alkaline with soda ash thereafter, leaving all other conditions the same as in Example 3, a dye is obtained, which is soluble in water with a dark green color, and dyes cotton in somewhat yellower duller shades than the dye of Example 3. It has probably the following structural formula:

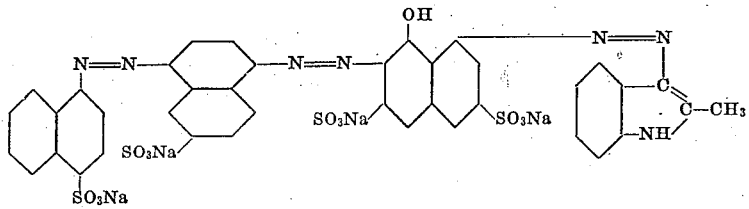

The reduction products by stannous chloride are the same as in Example 3, except instead of alpha-amino-aceto-acetanilid there is obtained amino methylketole.

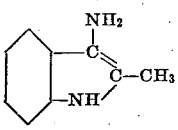

Example 10.

Substituting in Example 3 for 177 parts of aceto-acetanilid 227 parts of aceto-acet-alpha-naphthalid (made by condensation of aceto-acetic-ester with alpha naphthylamine) leaving all other conditions the same as in Example 3, a somewhat yellower, slightly duller green is obtained. It has probably the following structural formula:

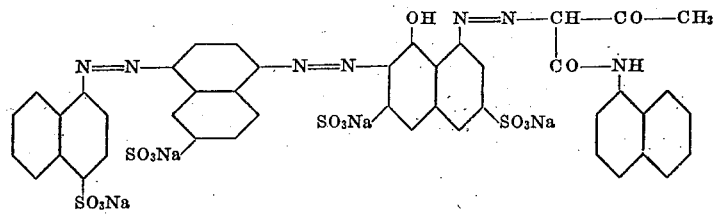

The reduction products by stannous chloride are the same as in Example 3, except instead of alpha-amino-aceto-acetanilid there is obtained alpha-amino-aceto-acet-alpha-naphthalid.

Dyes made according to the process described and exemplified above have an unusual affinity for cotton, and show a very good fastness to light. They are adapted for direct application to cotton by the ordinary methods from either a neutral or slightly alkaline dye-bath. They may also be used on silk with a slightly acid, for example acetic acid, dye bath. It will be noted that in every instance the compound employed for the last component comprises the group

[hexagon]—N—R wherein R represents a radical containing either a —CO—CH= group or a >C=H group.

I claim:

1. The process of producing a trisazo dye which comprises diazotizing a disazo compound prepared by coupling an aromatic diazo-azo compound to a 1:8-amino naphthol compound having a free amino group attached to the nucleus and coupling the resulting diazo compound to a compound selected from the group including acyl-acetarylids, aryl pyrazolones and alkyl ketoles.

2. The process of producing a trisazo dye which comprises diazotizing a disazo compound prepared by coupling an aromatic diazo-azo compound to a 1:8-amino naphthol compound having a free amino group attached to the nucleus and coupling the resulting diazo compound to a compound selected from the group including aceto-acetarylids, aryl pyrazolones and methyl ketoles.

3. The process of producing a trisazo dye which comprises diazotizing a disazo compound prepared by coupling an aromatic diazo-mono-azo compound to a 1:8-amino naphthol sulfonic acid having a free amino group attached to the nucleus and coupling the resulting diazo-disazo compound to an aceto-acetarylid.

4. The process of producing a trisazo dye which comprises diazotizing a disazo compound prepared by coupling an aromatic diazo-mono-azo compound to a 1:8-amino naphthol compound having a free amino group attached to the nucleus and coupling the resulting diazo-disazo compound to an aceto-acetanilid.

5. The process of preparing a trisazo dye comprising diazotizing an aryl amino compound, coupling the diazo compound to an aromatic amino compound to obtain an azo compound, diazotizing said compound, coupling the resulting diazo compound to a 1:8-amino naphthol sulfonic acid having a free amino group attached to the nucleus, diazotizing again and coupling the diazo compound with a compound having the grouping $CH_3$—CO—CH—CO—NH—R, wherein R represents a radical containing an aryl group.

6. The process of preparing a trisazo dye comprising diazotizing ortho-toluidine, coupling the diazo compound to an aromatic amino compound to obtain a mono-azo compound, diazotizing said compound, coupling the resulting diazo compound to 1:8-amino-naphthol-3:6-disulfonic acid to obtain a disazo compound, diazotizing again and coupling the diazo compound with aceto-acetanilid.

7. A trisazo dye comprising the grouping 1:8-azo naphthol coupled to an end component selected from the group including acyl-acetarylids, aryl pyrazolones and alkyl ketoles.

8. A trisazo dye comprising the grouping 1:8-azo naphthol coupled to an end component selected from the group including aceto-acetarylids, aryl pyrazolones and methyl ketoles.

9. A trisazo dye obtainable by coupling a diazo-disazo compound, derived from compounds of the benzene or naphthalene series and containing a 1:8-amino-naphthol sulfonic acid group in coupling position, with a compound selected from the group including aceto-acetarylids, aryl pyrazolones and methyl ketoles.

10. A trisazo dye obtainable by coupling a diazo-disazo compound, derived from compounds of the benzene or naphthalene series and containing a 1:8-amino-naphthol sulfonic acid group in coupling position, with aceto-acetanilid.

11. A trisazo dye comprising the group 1:8-azo-naphthol coupled to an end component having the grouping $CH_3$—CO—CH—CO—NH—R, wherein R represents a radical containing an aryl group.

12. A trisazo dye obtainable by diazotizing orthotoluidine, coupling the diazo compound to an aromatic amino compound to obtain a mono-azo compound, diazotizing said compound, coupling the resulting diazo compound to 1:8-amino-naphthol-3:6-disulfonic acid to obtain a disazo compound, diazotizing again and coupling the diazo compound with aceto-acetanilid.

In testimony whereof I affix my signature.

HENRY JORDAN.

Certificate of Correction.

Patent No. 1,716,063.             Granted June 4, 1929, to

HENRY JORDAN.

It is hereby certified that error appears in the printed specification of the above numbered patent requiring correction as follows:

Page 1, line 55, after the word "of" second occurrence, insert the article *the;* page 2, in the formula after line 27, under the first double ring, for "$SC_3Na$" read $SO_3Na;$ page 3, line 80, for the misspelled word "cottom" read *cotton;* page 4, strike out line 45 and insert instead *either a —CO—CH= group or a >C=CH;* and that the said Letters Patent should be read with these corrections therein that the same may conform to the record of the case in the Patent Office.

Signed and sealed this 2nd day of July, A. D. 1929.

M. J. MOORE,

[SEAL]           *Acting Commissioner of Patents.*

Certificate of Correction.

Patent No. 1,716,063. Granted June 4, 1929, to

HENRY JORDAN.

It is hereby certified that error appears in the printed specification of the above numbered patent requiring correction as follows:

Page 1, line 55, after the word "of" second occurrence, insert the article *the;* page 2, in the formula after line 27, under the first double ring, for "$SC_3Na$" read $SO_3Na;$ page 3, line 80, for the misspelled word "cottom" read *cotton;* page 4, strike out line 45 and insert instead *either a $-CO-CH=$ group or a $>C=CH;$* and that the said Letters Patent should be read with these corrections therein that the same may conform to the record of the case in the Patent Office.

Signed and sealed this 2nd day of July, A. D. 1929.

M. J. MOORE,

[SEAL] *Acting Commissioner of Patents.*